US008956222B2

(12) United States Patent
LeMay et al.

(10) Patent No.: US 8,956,222 B2
(45) Date of Patent: Feb. 17, 2015

(54) MOBILE DEVICE INTERFACES AT AN ELECTRONIC GAMING MACHINE

(75) Inventors: Steven G. LeMay, Reno, NV (US); Dwayne R. Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 399 days.

(21) Appl. No.: 13/217,110

(22) Filed: Aug. 24, 2011

(65) Prior Publication Data

US 2013/0053136 A1 Feb. 28, 2013

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ............ *G07F 17/3218* (2013.01); *G07F 17/32* (2013.01)
USPC .................... 463/29; 463/16; 463/20; 463/25

(58) Field of Classification Search
USPC .......................................... 463/16, 20, 25, 29
See application file for complete search history.

(56) References Cited

U.S. PATENT DOCUMENTS

| | | | | |
|---|---|---|---|---|
| 6,676,522 | B2 | 1/2004 | Rowe et al. | |
| 7,167,724 | B2 * | 1/2007 | Yamagishi | 455/556.1 |
| 7,611,409 | B2 | 11/2009 | Muir et al. | |
| 8,079,904 | B2 * | 12/2011 | Griswold et al. | 463/25 |
| 2002/0094869 | A1 * | 7/2002 | Harkham | 463/42 |
| 2002/0111209 | A1 * | 8/2002 | Walker et al. | 463/25 |
| 2002/0196342 | A1 * | 12/2002 | Walker et al. | 348/157 |
| 2003/0027632 | A1 * | 2/2003 | Sines et al. | 463/29 |
| 2003/0104865 | A1 * | 6/2003 | Itkis et al. | 463/39 |
| 2003/0144052 | A1 * | 7/2003 | Walker et al. | 463/20 |
| 2005/0101383 | A1 * | 5/2005 | Wells | 463/39 |
| 2006/0025206 | A1 * | 2/2006 | Walker et al. | 463/20 |
| 2006/0046823 | A1 * | 3/2006 | Kaminkow et al. | 463/16 |
| 2006/0189382 | A1 * | 8/2006 | Muir et al. | 463/29 |
| 2006/0287072 | A1 * | 12/2006 | Walker et al. | 463/25 |
| 2007/0190494 | A1 * | 8/2007 | Rosenberg | 434/11 |
| 2007/0202941 | A1 | 8/2007 | Miltenberger et al. | |
| 2008/0076572 | A1 | 3/2008 | Nguyen et al. | |

(Continued)

OTHER PUBLICATIONS

U.S. Appl. No. 13/156,903, filed Jun. 9, 2011.
U.S. Appl. No. 13/157,166, filed Jun. 9, 2011.

(Continued)

*Primary Examiner* — Sunit Pandya
*Assistant Examiner* — Wei Lee
(74) *Attorney, Agent, or Firm* — Neal, Gerber & Eisenberg LLP

(57) ABSTRACT

A gaming system compatible with patron-controlled portable electronic devices, such as smart phones, is described. In particular, an electronic gaming machine (EGM) can be configured with a power interface that allows portable electronic device carried by the patron to receive power. To prevent patrons from monopolizing an EGM for the purposes of solely charging their portable electronic device, the EGM can be configured with power interface control logic that controls the flow of power to the power interface including cutting off power to the power interface. The EGM can include an object detection capability that allows objects, such as a portable electronic device located on or near the EGM to be detected. In one embodiment, when the EGM detects an object has been abandoned, i.e., left at the EGM by a patron, the EGM can be configured to take actions that allow the object to be recovered.

24 Claims, 6 Drawing Sheets

(56) References Cited

U.S. PATENT DOCUMENTS

| | | | | |
|---|---|---|---|---|
| 2008/0293483 | A1 * | 11/2008 | Pickus et al. .................... | 463/29 |
| 2009/0098943 | A1 | 4/2009 | Weber et al. | |

OTHER PUBLICATIONS

U.S. Appl. No. 13/217,105, filed Aug. 24, 2011.
U.S. Appl. No. 13/220,430, filed Aug. 29, 2011.
U.S. Appl. No. 13/333,659, filed Dec. 21, 2011.
U.S. Appl. No. 13/333,669, filed Dec. 21, 2011.
U.S. Appl. No. 13/333,679, filed Dec. 21, 2011.
U.S. Appl. No. 13/299,199, filed Nov. 17, 2011.
U.S. Appl. No. 13/333,623, filed Dec. 21, 2011.
U.S. Appl. No. 13/229,494, filed Sep. 9, 2011.
U.S. Appl. No. 13/229,507, filed Sep. 9, 2011.
U.S. Appl. No. 13/229,536, filed Sep. 9, 2011.
U.S. Appl. No. 13/231,275, filed Sep. 13, 2011.
U.S. Appl. No. 13/308,213, filed Nov. 30, 2011.
U.S. Appl. No. 13/308,160, filed Nov. 30, 2011.
U.S. Appl. No. 13/335,652, filed Dec. 22, 2011.
U.S. Appl. No. 13/306,911, filed Nov. 29, 2011.
U.S. Appl. No. 13/361,601, filed Jan. 30, 2012.
U.S. Appl. No. 13/335,613, filed Dec. 22, 2011.
U.S. Appl. No. 13/426,479, filed Mar. 21, 2011.

* cited by examiner

MOBILE DEVICE INTERFACES AT AN ELECTRONIC GAMING MACHINE

BACKGROUND

1. Field of the Described Embodiments

The described embodiments relate generally to gaming systems, such as gaming systems deployed in a casino enterprise. More particularly, apparatus and method for developing and maintaining customer loyalty in the casino enterprise are described.

2. Description of the Related Art

Developing and maintaining a loyal customer base is a critical component of operating a successful casino enterprise. To develop a loyal customer base, casino enterprises attempt to generate interactions with their patrons that provide a unique and personalized game playing experience. As an example, casino enterprises offer patrons the opportunity to participate in a loyalty program. Via the loyalty program, patrons are offered various promotions and free items that encourage the patron to return to the casino. In the loyalty program, the promotions can be tailored to the patron's preferences. As an example, if preferred, a patron can choose to receive promotional credits for game play on an electronic gaming machine and information regarding this preference can be stored to an account associated with the loyalty program. In general, information regarding the patron's preferences in regards to promotions as well as other activities within the casino enterprise, such as food, drink and room preferences, can be stored to their account associated with the loyalty program. The patron information stored in the account can be used to personalize the service and the game playing experience provided by the casino enterprise.

An ever increasing portion of patrons that visit casinos are regularly carrying portable electronic devices, such as smart phones, laptops, netbooks and tablet computers, on their person. The portable electronic devices provide 1) a means of communication allowing the patron to communicate with other individuals within or outside of a casino via a number of different communication modes, 2) a source of news and information, 3) a portal to the patron's on-line activities, such as social media applications, 4) support for entertainment features, such as audio/video playback and gaming applications, 5) a repository for personal information, such as financial information that enables financial transactions in a mobile wallet applications and 6) a means of capturing information, such as video images and audio recordings. Thus, portable electronic devices, such as smart phones, are becoming essential tools and in some instances, the primary electronic interface for many individuals.

The popularity of portable electronic devices allows for the possibility of utilizing their capabilities to further personalize and enhance the gaming experience in a casino gaming environment. In view of the above, methods and apparatus are desired that allow for complementary interactions with a portable electronic devices within a casino environment, such as when a patron is participating in game play on an electronic gaming machine.

SUMMARY OF THE DESCRIBED EMBODIMENTS

A gaming system compatible with user-controlled portable electronic devices, such as smart phones, is described. In particular, electronic gaming machines (EGM) in the gaming system can be configured with a power interface that allows portable electronic device carried by a patron to receive power. The inclusion of a power interface can encourage and enable the use of portable electronic devices and their capabilities at an EGM. To prevent patrons from monopolizing an EGM for the purposes of solely charging their portable electronic device, the EGM can be configured with power interface control logic that controls the flow of power to the power interface. In one embodiment, the power interface control logic can be configured to provide power to the power interface based upon recent game play activity on the EGM.

In some instances, an EGM can include a structural feature configured to receive a portable electronic device, such as a smart phone or a tablet computer. The EGM can be configured to detect the presence of an object, such as but not limited to a device placed in the structural feature configured to receive the portable electronic device. The detection capability may also allow the EGM to detect an object located on or near the EGM, such as a portable electronic device located on a player input panel associated with the EGM or a device located on the floor near the base of the EGM. In one embodiment, the EGM can include a power interface, such as a charge pad, that allows power to be provided to a portable electronic device. The detection capability can be configured to detect a portable device placed on the charge pad. When the presence of a portable electronic device is detected proximate to the EGM, the EGM can be configured to generate in response to certain events on the EGM, such as a "cash out" request, a reminder for a patron to take their portable electronic device.

In some instances, the EGM can be configured to determine an object, such as a portable electronic device, has been "abandoned" at the EGM. In response to the determination of an abandoned object, the EGM can be configured to perform actions that may allow the object to be recovered and hopefully, returned to the patron that left the device. For instance, the EGM can be configured to send a message to a server that indicates a casino employee should recover the abandoned object and the proximate location of the device. In another example, the EGM can be configured to change its state, such as the state of a lighting device on the EGM, to draw attention to the EGM so that a casino employee can recover the object. One benefit of the abandoned object feature is that it may encourage the utilization of portable electronic devices in a casino gaming environment.

One aspect of the methods and apparatus described herein is related to an electronic gaming machine. The electronic gaming machine can include: a) a cabinet; b) a power interface assembly including a power interface and a switch integrated into the cabinet wherein the switch is configured to interrupt a power supply to the power interface in response to commands received from a game controller and wherein the power interface allows power to be delivered to a portable electronic device; c) the game controller including a processor and a memory coupled to the power interface and secured within the gaming cabinet configured to 1) control a wager-based game, 2) determine an amount of charge time available for the power interface wherein the amount of charge time available depends on at least an amount of charge time earned from game play activities on the electronic gaming machine, 3) interrupt the power supply to power interface via the switch when it is determined the amount charge time available is below a minimum amount.

Another aspect of the methods and apparatus described herein is related to method in an electronic gaming machine including a power interface configured to provide power to a portable electronic device. The method can be generally characterized as including: 1) switching the power to the power interface off; 2) receiving an input signal initiating a first wager-based game; 3) determining an amount of charge time earned for the first wager-based game; 4) switching the power interface on; 5) repeatedly determining a charge time remaining based upon the determined amount of charge time earned for the first wager-based game and a time since the first wagered-based game was initiated; and 6) switching the power interface off when the charge time remaining reaches a minimum threshold amount.

BRIEF DESCRIPTION OF THE DRAWINGS

The embodiments will be readily understood by the following detailed description in conjunction with the accompanying drawings, wherein like reference numerals designate like structural elements, and in which.

DESCRIBED EMBODIMENTS

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

A gaming system compatible with portable electronic devices controlled by users of the gaming system is described. The gaming system can include a number of features that encourage and enable the use of portable electronic devices, such as smart phones and tablet computers, in a casino gaming environment. In particular embodiments, electronic gaming machines (EGMs) used in the gaming system can include interfaces for receiving communications and/or providing power user-controlled portable electronic devices. Further, the EGM can be equipped to detect the presence of a portable electronic device located on or near the gaming machine. Details of an EGM with these capabilities are described with respect to FIG. 1. A game controller within the EGM can be configured to control power to the power interface, detect the presence of portable electronic devices proximate to the EGM and determine whether the device has been abandoned or not. Details of a game controller configured for these purposes are described with respect to FIG. 2. With respect to FIG. 3, a method for controlling power to the power interface is discussed. In one embodiment, whether power is supplied to the power interface or not can depend on recent gaming activity on the EGM. With respect to FIG. 4, a method of detecting the presence of a portable electronic device proximate to the EGM is described. The method can include determining whether the portable electronic device has been abandoned at the EGM. Finally, additional details of a game controller and an EGM are described with respect to FIGS. 5 and 6.

Figure 1:
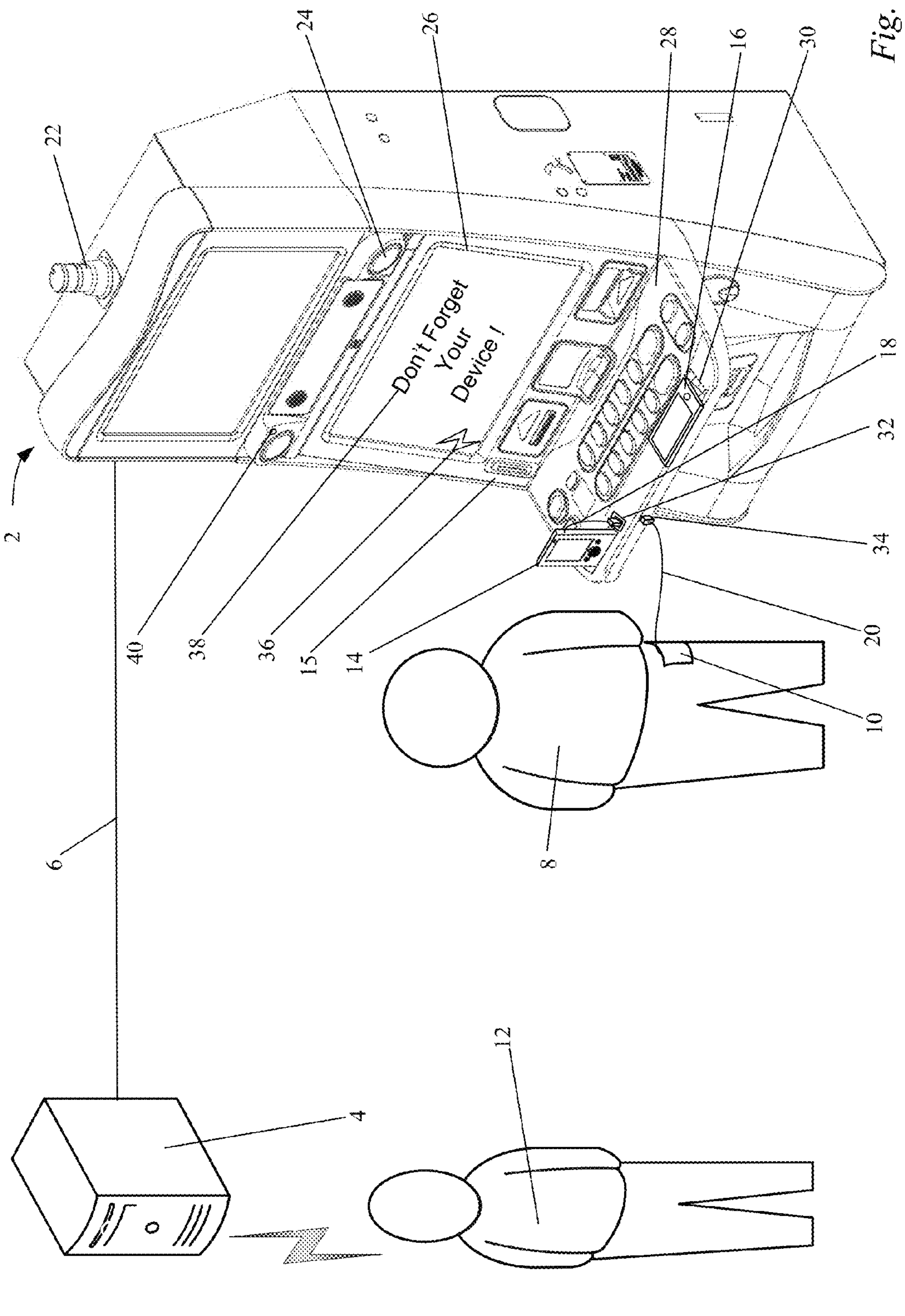
FIG. 1 shows an electronic gaming machine with interfaces for a portable electronic device in accordance with the described embodiments.

FIG. 1 shows an EGM 2 with interfaces for interacting with a portable electronic device. The EGM 2 can be part of a gaming system that includes a number of gaming devices and servers, such as 4. The communication connection 6 between the EGM 2 and the server 4 can be wired, wireless or a combination of wired and wireless communication links depending on the local and/or wide area network topology used within the gaming system. The EGM 2 can include a) displays, such as a main display 26 on which a wager-based game can be output, b) audio devices, such as speaker 24 for outputting sounds from the EGM and c) a player input panel 28 including buttons for making inputs associated with the play of the wager-based game. These devices can be controlled by a game controller (not shown) located within the cabinet of the EGM 2. Further details of EGM's game controller are described with respect to FIGS. 2, 5 and 6.

The EGM 2 can include a number of different types of interfaces that enable interactions with a portable electronic device, such as a smart phone or a tablet computer. One type of interface is a power interface. Via a power interface, power can be supplied to the portable electronic device. For instance, power interfaces 32 and 34 can be configured to receive a connector that allows an electronic device to be electrically coupled to the EGM 2. In one embodiment, the power interface 32 and 34 can be configured to accept a USB connector and thus, can be compatible with USB connector power requirements. Other types of power interfaces, such as a standard 120V receptacle can be provided. Thus, these examples are for the purposes of illustration only.

The EGM can be configured to switch power on/off to the power interfaces. In particular embodiments, the power can be switched on and off to the one or more power interfaces according to such factors as a current state of the EGM, a game state history of the EGM or a status of the player at the EGM. One purpose of the power switching can be to discourage users from charging their devices at an EGM without playing. Thus, in a particular embodiment, the availability of power at the power interface can be linked to whether the user is playing at a game at the EGM 2. Further details of a switching algorithm that can be employed are described with respect to FIG. 3. Additional details of embodiments of power interfaces that can be integrated into an EGM 2 are described as follows.

In general, one or more power interfaces can be provided. When two or more power interfaces are provided the interfaces can employ the same or different power configurations. For instance, when two interfaces are provided, both can be configured to accept a USB connector or a first can be configured to be compatible with a USB connector while a second can be compatible with a two pronged connector. Thus, the voltage and current supplied by each power interface can vary from interface to interface depending on the power standard for which the power interface is configured.

The one or more power interfaces can be located on different surfaces of the EGM 2. For instance, power interface 32 is located on an upper surface of the player input panel 28 and power interface 34 is located on a front surface of the player input panel 28. In other examples, the power interfaces can be located on a different surface, such as a front surface 15 of the EGM cabinet.

A connector 18 is shown leading from power interface 32 to portable device 14 positioned on the player input panel 28 and a connector 20 is shown leading from power interface 20 to a portable device (not shown) located in the pocket 10 of user 8. At the device end, the connector, such as 18 or 20, can include a power interface compatible with the portable device, such as device 14 or the device located in the pocket of user 8. At the EGM end, the connector, such as 18 or 20, can include a power interface compatible with the EGM power interface. The interfaces at each end of the connector can be coupled via a cord. Typically, the interface between a connector (e.g., 18 or 20) and a portable device varies widely from model to model and from manufacturer to manufacturer where the interface at the device end can transmit communications and/or power to the portable device. Thus, in one embodiment, the connector, such as 18 and 20, can be provided by the user, such as 8.

If a standard portable device interface is ever widely adopted and incorporated in portable devices, then this type of interface can be provided on the EGM 2. For instance, many portable devices provide a female receptacle for mini-USB interface. Thus, the EGM might include an integrated “male” mini-USB connector for interfacing with these devices. In one embodiment, a power interface including a “male” connector may include a cord connecting the “male” connector to the EGM 2. The opposite end of the cord can be connected within the interior of the EGM 2 so that the connector can’t be pulled from the EGM 2. The cord portion of the connector, between the ends, can include a cut resistant outer material to prevent the male connector from being removed.

In another embodiment, the male connector can be mounted to a surface of the EGM 2 such that only the male connector extends from the surface without a cord section extending from the EGM 2 coupled to the male connector. The male connector can be connected to a joint that allows the angle of male connector relative to the surface from which it extends to be adjusted to help accommodate different devices.

In yet another embodiment, an interface 30 for wireless power transmission can be provided on the EGM 2. As an example, player input panel 28 includes a wireless power interface 30, such as a Powermat™ (Powermat Inc, Commerce Charter Township, Mich.). The wireless power interface can be compatible with a number of different types of devices. A portable device 16 is shown resting on the wireless power interface in a position that allows it to receive power via the wireless power interface 30. Power to the wireless power interface can be switched on and off depending on the machine status.

In particular embodiments, the interfaces 30, 32 and 34 can include sealing mechanisms that are configured to protect the interface in the case of spill, such as a user spilling a drink on the interface. Further, the interfaces can be configured to protect against electrostatic discharge (ESD). The ESD protection can include isolation circuits, filtering circuits, and suppression components, such as multilayer varistors, silicon diodes, and polymer-based suppressors. Suppression components protect the circuit by clamping the ESD voltage to a level that the circuit can survive. Connected in parallel with the signal lines, the suppressors clamp the ESD voltage and shunt the majority of the ESD current away from the data line, and the protected chip, to the appropriate reference. Typical references are the power rail and chassis ground.

In alternate embodiments, one or more of the interfaces 30, 32 and 34, can be configured as power and data interfaces or as a data only interface. For instance, via interface 32 and connector 18, power and data can be transmitted from the EGM 2 to the portable device 14 or only data can be transmitted between the EGM 2 and the device 14. In one embodiment, for security purposes, when a data interface is provided, the communications can be uni-directional such that only data can be sent from the EGM 2 to the portable device via the data interface. In other embodiments, the return communications that can be sent from the device to the EGM 2 and recognized by the game controller can be very limited for security purposes. The format of the return communications can be described a communication protocol (and/or implemented with an API).

The EGM 2 can support one or more wireless communication interfaces for communicating with a portable device, such as 14 or 16. For instance, a first communication wireless interface can support Bluetooth™ communications, a second wireless communication interface can support communications via Wi-Fi™ (compatible with IEEE 802.11 standards) and a third wireless communication interface can support a NFC communication protocol (see FIG. 5 for more detail). In one embodiment, a wireless communication interface can be integrated or located proximate to the wireless power interface. For example, a wireless communication interface supporting an NFC communication protocol can be integrated with the wireless power interface 30. Thus, when the device 16 is placed near the wireless communication interface 30, NFC formatted communication can occur between the device 16 and the EGM 2. In other embodiments, the wireless communication interfaces can be placed in other locations within the EGM 2. Thus, the placement near the wireless power interface is discussed for the purposes of illustration only.

In one embodiment, the NFC communication can be used to exchange information to allow pairing to be established between a user-controlled device and the EGM 2. For instance, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol allows for a Wi-Fi device pair directly with another without having to first join a local network. The method makes it possible to share media from a phone, play multiplayer games or otherwise communicate directly, even when no router exists. Via pairing between the EGM 2 and portable electronic device, a portable electronic device may be able to utilize some of the functionality of secondary devices residing on the EGM 2. For instance, it may be possible for a player to print something from their portable electronic device using the printer on the EGM 2 when it is paired to the EGM 2.

The EGM 2 can include one or more support structures configured to receive a portable electronic device. The support structures can be integrated into the EGM cabinet such that a device placed in the support structure isn’t easily knocked out of the support structure and placement of the device doesn’t block access to input buttons on the EGM 2 during game play. The support structure can be configured to support a device various positions, such as upright, on its side or on its back. Further, the support structures can be configured to allow a device received in the support structure to be positioned in a preferred orientation. For instance, device 14 is placed in a support structure with a receptacle built into the player input panel 28 that allows the device to be orientated in an upright position. As another example, device 16 is placed flat on a ledge of the player input panel 28. The ledge can include an indentation or a high-friction material (anti-slip) that is designed to keep the device 16 from sliding off of the ledge. Support structures can be placed in other locations on the EGM cabinet and these examples are provided for the purposes of illustration only.

The support structure can include a stand or bracket for supporting the device. In one embodiment, the support structure can include a switch that is activated by a weight of the portable electronic device. The switch may be used for device detection purposes. The support structure can be sealed to provide protection in the event of spills. Further, it can include other tamper-resistant features, such as features that prevent the internal elements of the EGM 2 from being exposed. In one embodiment, a NFC interface can be located proximate to the support structure, such that it can be utilized when a device is placed in the support structure.

In alternate embodiments, the support structure, data interfaces and power interfaces can be incorporated into a secondary device utilized on the EGM 2. For instance, one or more of a support structure, a power interface or a wireless interface can be incorporated into a player tracking unit with a smart interface board (SMIB), a card reader, a bill validator or a printer. Further, all or a portion of the control of the power interfaces and/or wireless interface in the manner described herein can be performed by a secondary processor on the secondary device in conjunction with or independently of the game controller on the EGM 2. In another embodiment, all or a portion of the control of the power interfaces and/or wireless can be implemented in a "service window" type architecture (see FIG. 6 for more details).

In particular embodiments, the EGM 2 can be configured to provide indicators of a status of a power and/or data interface. For instance, in one embodiment, when a power and/or data interface is active, an icon indicating a status of the interface can be displayed on the EGM 2. For example, a lightning bolt 36 is shown on display 26 to indicate that power is actively being supplied to one of the power interfaces. Similarly, another icon can be displayed to represent an active communication session via a communication interface, such as a communication interface involving a wired or wireless connection between the EGM 2 and a portable electronic device.

In other embodiments, an interface, such as 30, 32 and 34, can be surrounded by lighted bezel, partially surrounded by a lighted bezel or include an indicator light near the interface. The lighted bezel can be configured to change color, emit a particular lighting pattern or combinations, such as flashing or steady, to indicate that the power interface is delivering power. For instance, a bezel or indicator can be lighted with a green color when power is being delivered to the interface and a red color when power is cut-off to the interface. In another example, a status light can be turned on when power is being delivered via the interface and turned off when power is not being supplied. Similar, status indicators can be used for communication interfaces to indicate an active or non-active communication session. For instance, the lighted bezel and/or audio feedback can be used to indicate proper device pairing, secure communications and/or recognition and successful establishment of communications.

Other types of feedback mechanisms can be utilized to indicate a status of an interface. For instance, audio devices can be used to provide audio feedback and/or vibration generating devices, which can also produce an audible buzz, can be used to provide feedback. These feedback mechanisms can be used alone or in combination with other feedback mechanisms, such as a light generating mechanism, to indicate the status of various processes implemented on the EGM 2.

In particular embodiments, the EGM 2 can be configured to detect the presence of a portable electronic device and/or user and encourage the user to retrieve their portable electronic device at the end of a game play session. For instance, the EGM 2 can include a camera, such as 40, with a field of view including the player input panel 28. Using image recognition software, the game controller can be configured to recognize an object, such as but not limited to a portable electronic device, left on the input panel 28. Image data received from a camera may also be used to recognize the presence of a user at the EGM 2 and possibly for eye tracking purposes. In one embodiment, a camera can be placed with a field of view of base of the EGM 2, such as the floor area beneath input panel 28. Image data from this camera can be used to recognize objects left on the floor of the EGM 2 near its base, such as a portable electronic or wallet that has fell onto the floor or a purse/bag left at the EGM 2. As described above, the presence of a portable electronic device can also be determined via signal strength and/or triangulation.

When a portable electronic device is detected near the EGM 2, the game controller can be configured, after certain game events, to notify a player to retrieve and/or disconnect their device from the EGM 2. For instance, after a cashout command is received by the game controller, the gaming controller can be configured to display a message 38, such as "Don't forget your device." As another example, the EGM 2 can be configured to emit a sound effect, such as a beeping to get the user's attention in regards to retrieving a device. In yet another example, the EGM 2 configured to flash lights in a distinctive pattern to get the user's attention.

In one embodiment, the EGM 2 can be configured to generate an "abandoned" object state. In the abandoned device state, the game controller has determined based upon information received at the EGM 2 that an object, such as portable electronic device, has been potentially left at the EGM 2. The likelihood that an object has been actually been abandoned can depend on the criteria used by the game controller to determine whether or not to enter into abandoned object state. Different criteria that determines whether the EGM 2 is to enter the abandoned device state is described in further detail with respect to FIGS. 2 and 4.

In a particular embodiment, when the EGM 2 enters an abandoned device state, the EGM 2 can send a message to a server on the network, such as server 4. In response to receiving the message, the server 4 can be configured to send a message to an electronic device carried by a casino employee, such as 12. The message can indicate the EGM 2 that has entered into the abandoned state. In response to receiving the message, the casino employee 12 can then travel to the EGM 2 and attempt to retrieve the device.

In one embodiment, in response to sending the message, the EGM 2 can clear the abandoned device state and enter into an idle state where it is available for game play. In other embodiments, upon entering into the abandoned device state, various features on the EGM 2 can be activated. For instance, the candle 22 can be activated with a particular light pattern to indicate the EGM 2 is in the abandoned device state or needs attention. However, the EGM 2 may still be available for game play. In another example, in abandoned device state, the EGM 2 can disable game play, such as via entering into a tilt state. In this example, operator intervention can be required to clear the abandoned device state and allow the EGM 2 to enter into the active state where game play is enabled on the device.

When the abandoned device state is entered, the EGM 2 can be configured to save and/or communicate information that can help to identify the owner of the device. If the user that was participating in game play just before the abandoned state is triggered has identified themselves, such as via providing loyalty program information, this information can be saved and included a message sent to server 4. If image data from a camera is available that includes the last patron at the EGM 2 prior to the triggering of the abandoned device state, then this image can be sent to server 4. If a wireless connection was established between the EGM 2 and an abandoned device, then information associated with the device used to establish the connection can be sent in the message to 4. In addition, the EGM 2 can send information about its state prior to the entering the abandoned device state, such as the a) game being played, b) the most recent amount of money deposited on the EGM 2, c) a time period of the last game play session on the EGM 2 (e.g., from the last time money was deposited on the EGM 2 prior to the abandoned device state to the occurrence of zero credits or a cashout command), d) a time when the abandoned state was triggered, e) a time when a potentially abandoned device was triggered, f) a location of the EGM 2, g) a location of the potentially abandoned device or object if it is known (e.g., on the player input panel or on the floor underneath the player input panel), h) combinations thereof.

In one embodiment, the gaming system can be configured to store the information described in the previous paragraph to a lost device database, as part of an incident report. Then, the system can be configured to allow queries of the database. For example, a patron seeking a lost device can report that at about a certain time, they were playing a certain game and believe they lost a particular device or object. This information can be entered into the system and the system can be queried to determine if any incident reports match the criteria provided by the patron seeking the lost device information.

Further, the information about a device may have been previously stored. For instance, the player can be using the device as a player tracking instrument and thus, the device may be associated with a particular player. In this instance, an alternate communication channel, such as an e-mail or alternate number provided by the player can be used to notify the player that the device has been recovered. If the player was staying at the gaming establishment, then a message and/or the recovered device can be delivered to the player's room. Next details in regards to how an abandoned device state can be triggered are described with respect to FIG. 2.

Figure 2:
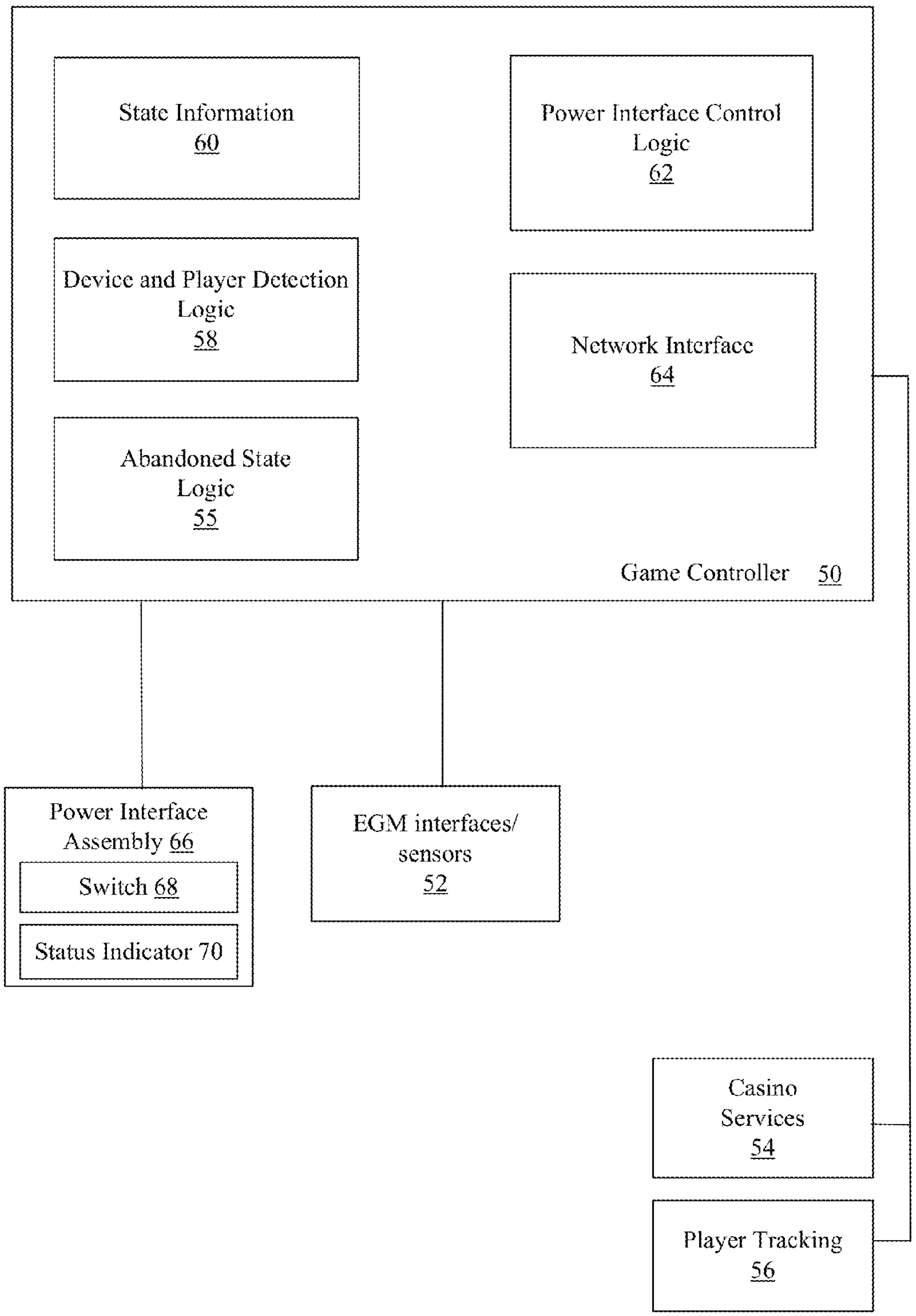
FIG. 2 shows a block diagram of a game controller in accordance with the described embodiments.

FIG. 2 shows a block diagram of a game controller 50 for an EGM. The game controller can be configured to control the play a wager-based game on an EGM. Towards this end, the game controller 50 can include logic for generating a state on the EGM 2. The game controller 50 can be configured collect and store state information 60 associated with each game state where the information that is stored can vary from state, such as but not limited to a posting of credits to the EGM, an indication of a wager, an indication to initiate a game and an establishment of a communication with a portable electronic device, etc. As described above, the state information 60 can be used to determine whether power is to be supplied to the power interface assembly 66.

The game controller 50 can also include a network interface 64 for communicating with remote devices, such as casino service server 54 and/or a player tracking server 56. As an example, the game controller 50 can contact the casino server with a message indicating an object has been abandoned at the EGM 2 as described with respect to FIG. 1. The player tracking server 56 can be used to retrieve player tracking information about a particular patron, such as their identity and status, stored in a player tracking account. As will be described in more detail below and with respect to FIG. 3, the status of a player can affect how a power interface assembly 66 on the EGM 2 is controlled.

The power interface control logic 62 can be used to control the power interface assembly 66. In one embodiment, the power interface assembly 66 can include a switch 68 that allows the flow of power to the assembly to be interrupted and a status indicator 70 that can be used to indicate a status of the power interface assembly, such as whether power is being delivered or not to the assembly 66. The power interface assembly 66 can be controlled by the power interface control logic 62. Further details of the power interface control logic are discussed with respect to FIG. 3.

The device and player detection logic 58 can be used to determine whether an object, such as portable electronic device and/or a user are present at the EGM 2. The player detection logic can utilize information received from various EGM interfaces 52 to make this determination, such as a camera, input buttons, a touchscreen interface, value input/output interfaces, wireless device interfaces and/or power interfaces. As described above, information associated with these interfaces, such as whether a wireless communication has been established between the EGM and a portable electronic device, can be stored as part of the state information 60.

When a device is detected at the EGM, the abandoned state logic 55 can be configured to initiate outputs on the EGM that remind a player to take the detected device to avoid it the device left at the EGM. Further, the abandoned state logic 55 can be used to determine when an abandoned device state is to be triggered. In one embodiment, the determination of whether to initiate an abandoned device state can be generated using information generated from the device and player detection logic 58 that indicates that a device and/or player is present at the EGM. Once an abandoned device state is triggered, the abandoned state logic can be configured to determine what actions to take during the state, such as notifying a casino attendant to retrieve the device and/or entering into a tilt state. Further, the abandoned state logic 55 can determine when to clear the abandoned device state, which can be based upon actions taken at the machine and/or inputs received at the EGM, such as inputs from a remote device or inputs from an operator via an operator menu on the EGM.

The game controller 50 can utilize a number of mechanisms and employ a number of different methods to determine whether a portable electronic device and/or a patron are nearby, which can be incorporated in the device and player detection logic 58. For example, the logic 58 can be configured to use gaming events, such as an indication of a deposit of money from a bill validator or inputs received from input devices associated with game play. It can be assumed that when these game related events are occurring and shortly thereafter, a person is nearby the EGM. Further, if an idle state is detected on the gaming machine for some period of time after a period of gaming activity. It can be assumed that a patron is not nearby. The use of a detection of gaming related events doesn't identify the presence of person or lack of presence of a person in all situations. For instance, a person can be located near an EGM in a position that allows them to play but may not be playing. Thus, the fact the EGM is in idle state will not detect a player in this scenario.

For the purposes of determining whether a device has been abandoned, it can be desirable to determine if a player playing the gaming machine has left or changed. It is possible that a first player can deposit money, play and then reach a zero balance or cashout. The zero balance or a cashout event can be followed by an amount of idle time. Then, the first player can deposit additional funds at the EGM or the first player can leave. In the instance where the first player leaves, a second player can deposit money, play and then cashout or reach zero balance. Using just game play events alone, it may not be possible to distinguish whether a single player or multiple players performed this sequence of events. However, in one embodiment, the player detection logic can be configured with the assumption that when a zero balance is reached or cashout command is received followed by a threshold amount of idle time, the player at the EGM has left and any new game play is initiated by a new player. When it is determined that a person is no longer present based upon the person detection criteria and it is determined that a device is still present at the EGM based upon the device detection criteria, then an abandoned device state can be triggered. Prior to the player leaving, the EGM can be configured to generate a reminder for the player to take their device to prevent the abandoned device state from occurring.

The likely hood detecting the presence or non-presence of a player can be increased by using more information from additional sources. For instance, a camera or other type of sensors 52, such as a motion detector, can be used to determine that a player is near the EGM. In one embodiment, image data from the camera can be used for the purposes of facial recognition. Further, the camera can be used for eye tracking purposes. The use of data from these devices may be used to determine that a user is nearby when game play is not occurring. Similarly, when a wireless or wired interface on the EGM receives information transmitted from a portable electronic device and establishes a communication session with the portable electronic device, it can be assumed that a portable electronic device is nearby and at least initially so is the person that brought the device into the vicinity of the EGM. The wireless or wired interface can be configured to detect the presence of a device, such as device drawing power and/or participating in a communication session with the interface and report when it is loses its connection to the device and can no longer detect it. This inability to detect a previously detected device can be used as an indication that the device is no longer present at the EGM. Thus, based upon this information, the logic 58 can be configured to indicate that the device is no longer present. Again, this determination doesn't guarantee that the portable device is no longer physically present because the user may have simply turned off the device or the device may have run out of power. However, as described above, the use of a camera may enable to the presence of a device or other object to be detected even if the device is no longer communicating via an interface with the EGM.

In some instances, it may be possible to determine approximately the location of a portable electronic device based upon wireless signals emitted from the portable electronic device. For instance, the wireless signal can be detected from a portable electronic device at multiple locations and the location can be estimated via triangulation or based upon signal strengths. In one embodiment, this information can be generated by a remote device, such as server 54 and transmitted to the EGM. The server 54 may provide regular updates of the positions of nearby electronic devices.

The location data can be used to determine whether a device has been left at the EGM. For instance, a portable electronic is detected nearby an EGM at around the same time as gaming has begun on the EGM and then, later the EGM can enter into an idle state. As described above, the entering of the idle state can indicate that the person playing the EGM has left. If the portable electronic device is still detected, e.g., its location has not changed and/or there is still a connection between the device and the EGM, the occurrence of these events can cause abandoned device state on the EGM to be triggered. As another example, if a second electronic device is detected near the EGM and/or gaming activities are initiated on the EGM and the first electronic device previously detected is still present, the logic 55 can determine that the first electronic device has been abandoned and the abandoned device state can be triggered.

In yet another example, a first electronic device can be detected at an EGM about the same time that player tracking information associated with a first player is detected. Then, player tracking information associated with a second player can be detected at the EGM while the first electronic device is still detected. Based upon, the detection of this combination of events, the abandoned device state can be triggered on the EGM. In general, one or more of game play activity, information from wireless and wired interfaces, sensor data (e.g., image data from a camera) and player tracking information received at the EGM can be used to determine whether a device has been abandoned. The sequence and timing of events relative to one another can affect the determination. For instance, a detection of game play activity and a detection of an electronic device at about the same time followed by an idle period on the EGM while the electronic device is still detected may trigger an abandoned device state because it is assumed that the idle period indicates the player has left. Next, with respect to FIG. 3, methods of controlling power to the power interface assembly 66 are described.

Figure 3:
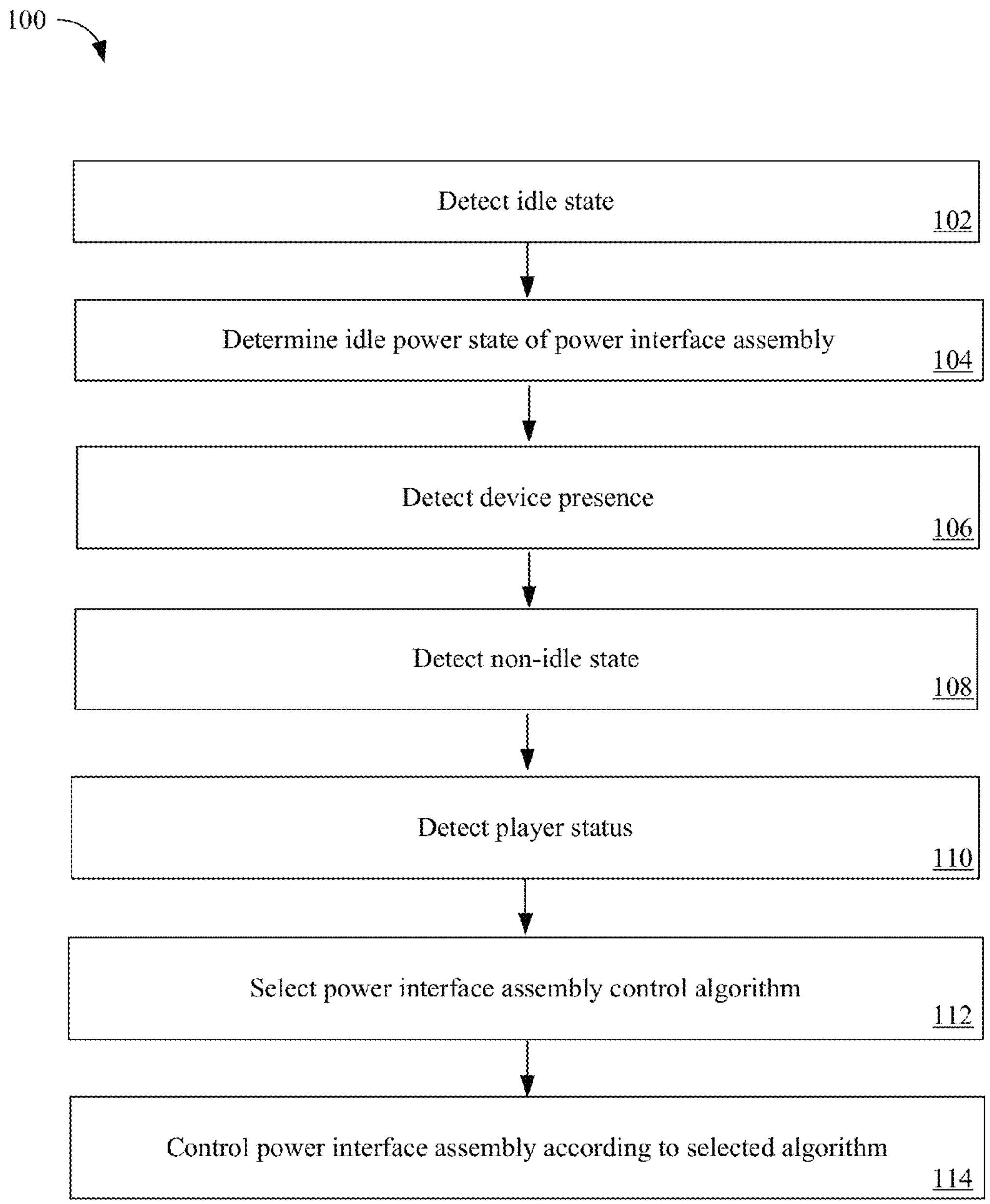
FIG. 3 is flow chart of a method for providing power to a power interface on an EGM in accordance with the described embodiments.

FIG. 3 is flow chart of a method 100 for providing power to a power interface on an EGM. In 102, an idle state can be detected on the EGM. In one embodiment, the idle state can be defined as zero credits available on the EGM and no activity for a time period. In 104, the idle power state can be determined for the power interface, such as the assembly described with respect to FIG. 2. In one embodiment, in the idle state, power to the power interface can be switched "on" in the idle state and the power interface indicator can be controlled to indicate power is available. If a device begins drawing power from the power interface before game play begins, the EGM can enter into an attract mode and/or generate a message indicating that to receive additional power game play is required.

In another embodiment, in the idle state, the power can be initially switched off and an indicator light associated with the power interface can be set to indicate the power off state. In 106, if a device is detected at the power interface (e.g., a connector is plugged into the power interface or a device is placed on a power mat), then again an attract feature can be displayed. In addition, a message can be displayed that indicates how power can be earned or maintained. For instance, a play of one game per minute can be required to keep the power interface going. In another example, an amount wagered per time can be required.

In one embodiment, based upon the amount wagered, an amount of power can be earned, such as 15 seconds for each dollar wagered or some amount of watts for each dollar wagered. The rate that power is earned can be configurable on the EGM. In one embodiment, the EGM can include a display meter that indicates how much power has been earned, such as an amount of charge time. The meter can account for power being earned and power being used by a device. In one embodiment, the EGM can include a "power-up" bonus where an amount of charge time on the EGM can be awarded to a user. Other services can also be earned in this manner, i.e., an amount based upon some EGM metric, such as internet access or phone service access.

The amount of charge time earned can be used to determine how the long the power interface will remain "on." As each game is initiated, an amount of charge that is earned can be determined. Then, the EGM can then begin to subtract time from the amount of time earned until the next game is initiated. When the amount of time remaining reaches zero or some minimum threshold amount, then the game controller can be configured to turn the power interface off.

In one embodiment, the amount of charge time earned and that is available to the power interface can be determined on a game by game basis. Thus, the amount earned can vary from game to game depending on game parameters such as amount wagered. However, EGM can be configured not to carry over any charge time earned from a previous a game that is remaining and add it to the charge time earned for the current game. In another embodiment, the amount of charge time that is earned from first game or a first series of games that is remaining when a second game is initiated can be added to the time earned for the second game. Thus, the depending on the rate of play, an amount charge time that is earned can be built up and the power interface can remain on as long as there is charge time remaining.

The EGM can be configured to limit the amount of charge time earned at any given time to a maximum threshold amount, such as a few minutes. For each game play, the amount of charge time earned can be determined and added to any time remaining that was earned from previous game play as described in the previous paragraph. However, the amount of charge time earned can be limited to thus maximum threshold amount. Thus, after a series of games played, there can be some time amount of charge time remaining. Then, another game can be initiated and the charge time earned for the game can be determined and added to the amount of charge time remaining. If the total charge time earned exceeds the maximum threshold amount then it can be set to the maximum threshold amount. Using a maximum threshold amount assures that some minimum rate of play needs to be maintained on the EGM for the power interface to remain on.

In 108, a non-idle state can be detected. For example, an amount of credits can be deposited on the EGM. In response, in one embodiment, the EGM can immediately start supplying power to the interface. In this instance, some initial amount of charge time can be given for depositing money on the gaming machine, such as a minute. However, if a game is not initiated within this initial time period, then the power interface can be shut off until game play begins.

In another embodiment, the EGM can begin determining one or more parameters, such as an amount wagered and/or amount wagered per time, and based upon the one or more parameters determine an amount of charge time earned. In response to a determination that charge time has been earned, the game controller can generate a command that causes the power on to the power interface to be switch-on and a command that causes a status indicator to indicate power is being supplied to the power interface if such a status indicator is provided. In one embodiment, the power interface may not be turned on until some minimum amount of charge time has been earned, such as 1 minute or 5 minutes worth of charging time.

In 110, a player status can be detected. The player status can be received from a host system, such as player tracking system host, in response to a player providing identification information associated with a loyalty program at the EGM. In one embodiment, if the player tracking system can indicate that the power is to be turned on to the interface independently of game play activities. For example, a high status player can insert their player tracking card in a card reader on the EGM or a communication session can be established between a portable electronic device and the EGM to initiate player tracking on the EGM. When properly identified, the EGM can turn on the power interface at the EGM and the power interface can remain on while the player tracking card remains in the card reader or the communication session is maintained between the portable electronic device and the EGM.

In one embodiment, a user can have an amount of charge time remaining from a previous game play session. The amount of charge time remaining can be stored to their player tracking account. When the player provides their account information at the EGM, the player tracking system can indicate how much charge time the player has remaining. Then, the amount of charge time a player has remaining can be made available on the EGM.

In 112, the power interface assembly control algorithm can be selected. The control algorithm that is used can depend on whether the player is a member of the casino's loyalty program and have provided information at the EGM that allows their account information to be accessed. In one embodiment, a high status player can have the power interface turned on and can receive unlimited charging time independently of their game play activities. A lower player status can earn charging time according to a first algorithm that depends on their game play activities. An unidentified player can earn charging time according to a second algorithm that depends on their game play activities. In one embodiment, an identified player can earn charge time at a faster rate for similar amounts of game play than an unidentified player. As another example, a maximum threshold amount of charge time that can be earned for a first player can be different than a second player.

In 114, the power interface assembly can be controlled according to the selected algorithm, i.e., switched on and off depending on whether charge time has been earned or not. In one embodiment, the power interface assembly can switch off when a cashout command or zero credits is reached on the EGM and any remaining charge time can be lost. In addition, the rate or other parameters that the EGM is tracking to determine whether to turn on the power interface or not can be reset. For instance, the EGM may not track a rate of play based upon game play that occurred before the cashout command or zero credit state was reached but only upon game play that subsequently occurs after additional credits are deposited on the EGM.

In another embodiment, after a cashout command or zero credits is reached, the EGM can allow any remaining earned charge time to be used. For instance, if a user has coupled a device to the power interface before a cashout command or zero credits were reached, the EGM can be configured to keep the power interface on and allow the device to receive the remaining charge time via the power interface until the remaining charge time is used. When an idle state is next detected, the EGM can return to 104 and determine the idle power state of the power interface assembly. In one embodiment, as described above, when a player has been identified, all or a portion of the charge time remaining can saved to their player tracking account. Then, charging time earned on a first EGM can be utilized on a second EGM.

Figure 4:
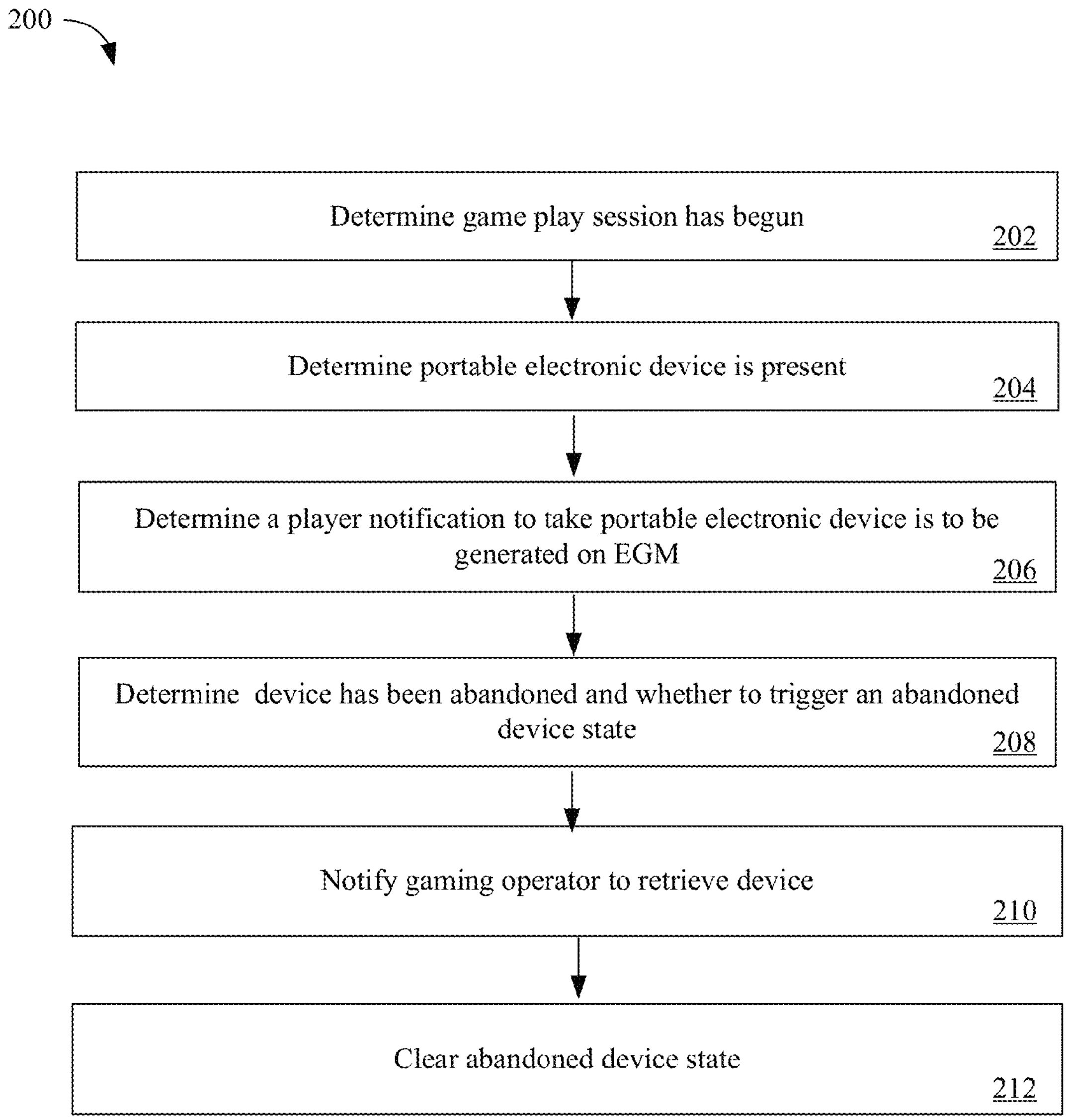
FIG. 4 is a flow chart of a method for detecting an abandoned portable electronic device at an EGM in accordance with the described embodiments.

Next details of the abandoned device are discussed. FIG. 4 is a flow chart of a method 200 for detecting an abandoned portable electronic device at an EGM. In 202, the EGM can determine that a game play session has begun. Based upon the occurrence of the game events, the EGM can be programmed for the purposes of triggering the abandoned device state that a player is present. In 204, before the game play session has begun or after the game play session has begun, the EGM can determine an electronic device is present at the EGM based upon a determination criteria described above. For instance, the EGM can establish a wireless communication session with a portable electronic device. The communication range of the interface can be small enough that the EGM can be programmed for the purposes of triggering the abandoned device state that an electronic device is present and associated with the player.

In 206, an event can be detected on the EGM that triggers a "remind the player to take their device" state. As an example, the event can be cashout command being received or a zero balance being reached on the EGM. In one embodiment, the EGM will only remind the player if a device has been detected. The reminder to the player can be generated as a message that is output to a display, a sound emitted by an audio device, a change in status of the lighting devices on the EGM (e.g., the buttons can flash) or combinations thereof.

In 208, the EGM can determine a device has been abandoned using some combination of inputs received at the EGM. An abandoned device can be indicated when the EGM is no longer able to detect the presence of a player but an electronic device is still detectable. For instance, if an electronic device is detected around the same time that game play begins on the EGM and then game play ceases on the EGM for some time period while the electronic device is still detectable, then the EGM can trigger and abandoned device state. In one embodiment, the abandoned device state can depend on whether a player has identified themselves at the EGM or not and if they have identified themselves what is their status in a loyalty program. For instance, in one embodiment, the abandoned device state may only be triggered for high status players.

If an abandoned device state is entered, the EGM can be configured to initiate a number of actions. For instance, in 210, the EGM can send a message that causes a gaming operator to retrieve the device. In another example, the EGM can save information that might help to identify the owner of the abandoned device, such as information regarding events that occurred on the EGM just prior to the abandoned device state being triggered. In yet another example, the EGM can suspend game play on the EGM for some time period. In 212, the EGM can clear the abandoned device state and return to normal operations including determining whether a new player and a new device are present at the EGM and determining whether the new device has been abandoned.

Figure 5:
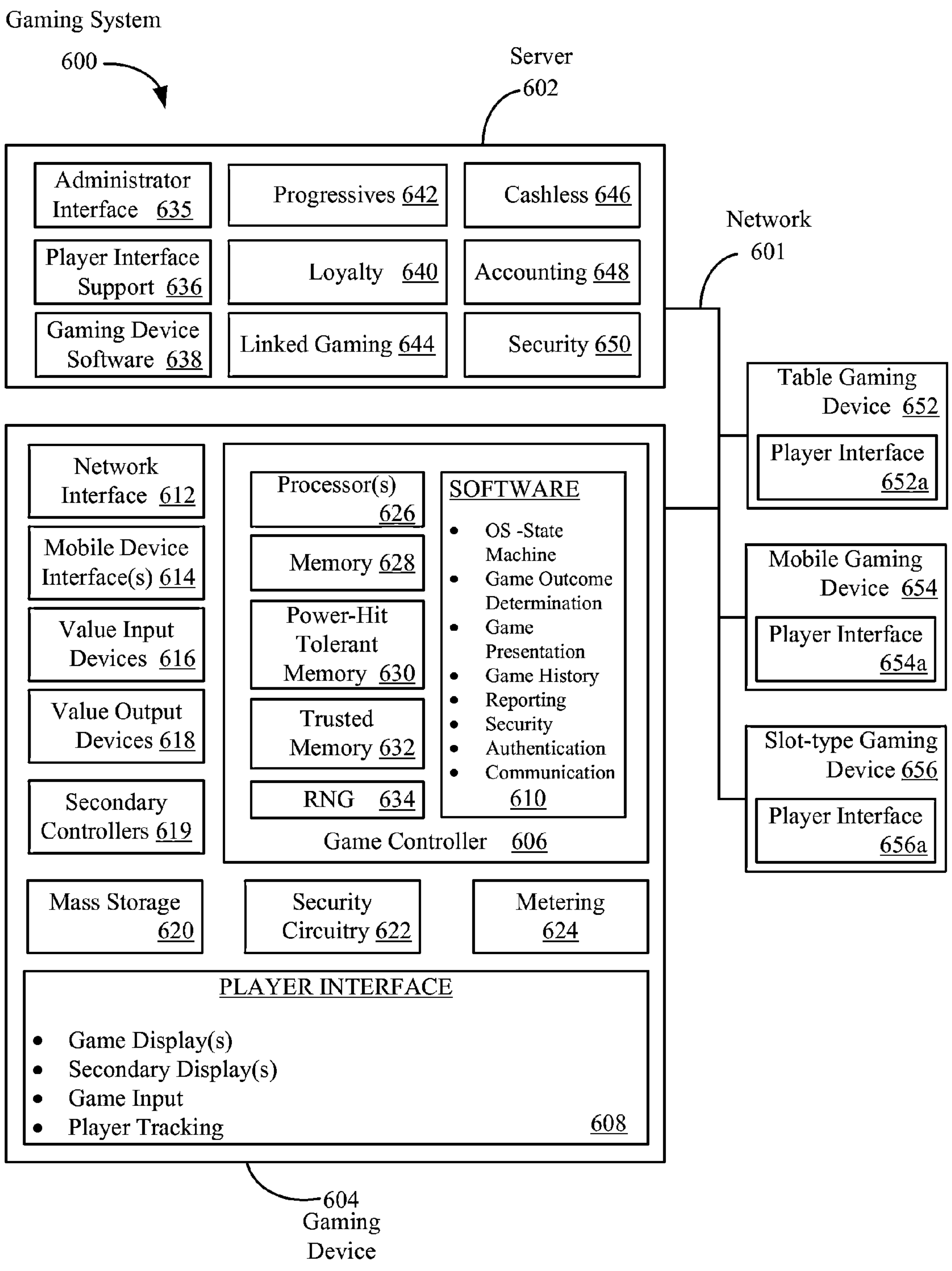
FIG. 5 shows a block diagram of a gaming system including a server and gaming devices in accordance with the described embodiments.

FIG. 5 shows a block diagram of a gaming system 600 in accordance with the described embodiments. The gaming system 600 can include one or more servers, such as server 602, and a variety of gaming devices including but not limited to table gaming devices, such as 652, mobile gaming devices, such as 654, and slot-type gaming devices, such as 656. The table gaming devices, such as 652, can include apparatus associated with table games where a live operator or a virtual operator is employed. The gaming devices and one or more servers can communicate with one another via a network 601. The network can include wired, wireless or a combination of wired and wireless communication connections and associated communication routers.

Some gaming devices, such as 652, 654 and 656, can be configured with a player interface that allows at least 1) selections, such as a wager amount, associated with a wager-based game to be made and 2) an outcome of the wager-based game to be displayed. As an example, gaming devices, 652, 654 and 656, include player interfaces, 652*a*, 654*a* and 656*a*, respectively. Typically, gaming devices with a player interface are located in publically accessible areas, such as a casino floor. On the other hand, some gaming devices, such as server 602, can be located in publically inaccessible areas, such is in a back-room of a casino or even off-site from the casino. Gaming devices located in publically inaccessible areas may not include a player interface. For instance, server 602 does not include a player interface. However, server 602 includes an administrator interface 635 that allows functions associated with the server 602 to be adjusted.

An example configuration of a gaming device is described with respect to gaming device 604. The gaming device 604 can include 1) a game controller 606 for controlling a wager-based game played on the gaming device and 2) a player interface 608 for receiving inputs associated with the wager-based game and for displaying an outcome to the wager-based game. In more detail, the game controller 606 can include a) one or more processors, such as 626, b) memory for holding software executed by the one or more processors, such as 628, c) a power-hit tolerant memory, such as 630, d) one or more trusted memories, such as 632, e) a random number generator and f) a plurality of software applications, 610. The other gaming devices, including table gaming device 652, mobile gaming device 654, slot-type gaming device 656 and server 602, can each include a game controller with all or a portion of the components described with respect to game controller 606. Typically, the power-hit tolerant memory is a non-volatile memory of some type.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 630 can be used as a persistent memory for critical data, such as critical data associated with maintaining a "state" machine on the gaming device. One characteristic of a power-hit tolerant memory 630 is a fast data transfer time. Thus, in the event of a power-failure, which might be indicated by a sudden power fluctuation, the critical data can be quickly loaded from volatile memory, such as RAM associated with the processor 626, into the power-hit tolerant memory 630 and saved.

In one embodiment, the gaming device 605 can be configured to detect power fluctuations and in response, trigger a transfer of critical data from RAM to the power-hit tolerant memory 630. One example of a power-hit tolerant memory 630 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 632 is typically a read-only memory of some type that may be designed to be unalterable. An EPROM or EEPROM are two types of memory that can be used as a trusted memory 632. The gaming device 604 can include one or more trusted memories. Other types of memories, such as Flash memory, can also be utilized as an unalterable memory and the example of an EPROM or EEPROM is provided for purposes of illustration only.

Prior to installation the contents of a trusted memory, such as 632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 604. In one embodiment, the error condition can result in the gaming device entering a tilt state where game play is temporarily disabled on the gaming device.

Sometimes verification of software executed on the gaming device 604 can be performed by a regulatory body, such as a government agency. Often software used by a game controller, such as 606, can be highly regulated, where only software approved by a regulatory body is allowed to be executed by the game controller 606. In one embodiment, the trusted memory 632 can store authentication programs and/or authentication data for authenticating the contents of various memories on the gaming device 604. For instance, the trusted memory 632 can store an authentication program that can be used to verify the contents of a mass storage device, such as 620, which can include software executed by the game controller 606.

The random number generator (RNG) 634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 604, are considered critical data. Thus, generated outcomes can be stored to the power-hit tolerant memory 630.

Not all gaming devices may be configured to generate their own game outcomes and thus, may not use an RNG for this purpose. In some embodiments, game outcomes can be generated on a remote device, such as server 602, and then transmitted to the gaming device 604 where the outcome and an associated award can be displayed to the player via the player interface 608. For instance, outcomes to a slot-type game or a card game can be generated on server 602 and transmitted to the gaming device 604.

In other embodiments, the gaming device 604 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes for a central determination game can be generated and stored on server 602. Next, in response to a request to play the central determination game on gaming device 604, one of the outcomes from the pool can be downloaded to the gaming device 604. A game presentation including the downloaded outcome can be displayed on the gaming device 604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 654 to server 602. After receiving the game outcome from the remote device, a game presentation for the game outcomes generated remotely can be generated and displayed on the mobile device. In some instances, the game presentation can also be generated remotely and then streamed for display to the mobile device.

The game controller 606 can be configured to utilize and execute many different types of software applications 610. Typically, the software applications utilized by the game controller 606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 626, such as programs for implementing a state machine on the gaming device 606. Further, the OS can be used to monitor resource utilization on the gaming device 606. For instance, certain applications, such as applications associated with game outcome generation and game presentation that are executed by the OS can be given higher priority to resources, such as the processor 626 and memory 628, than other applications that can be executing simultaneously on the gaming device.

As previously described, the gaming device 604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 606. The peripheral devices used to generate components of the game outcome presentation can be associated with the player interface 608 where the types of devices that are utilized for the player interface 608 can vary from device to device.

To play a game, various inputs can be required. For instance, via input devices coupled to the gaming device 604, a wager amount can be specified, a game can be initiated or a selection of a game choice associated with the play of the game can be made. The software 610 executed by the game controller 606 can be configured to interpret various signals from the input devices, such as signals received from a touch screen controller or input buttons, and affect the game played on the gaming device in accordance with the received input signals. The input devices can also be part of the player interface 608 provided with the gaming device, such as 604.

In other embodiments, the gaming software 610 executed by the game controller 606 can include applications that allow a game history including the results of a number of past games to be stored, such as the previous 10 or 100 games played on the gaming device 604. The game history can be stored to a persistent memory including but not limited to the power-hit tolerant memory 630. The gaming controller 606 can configured to provide a menu (typically, only operator accessible), that allows the results of a past game to be displayed via the player interface 608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 604.

The reporting software can be used by the game controller 606 to report events that have occurred on the gaming device 604 to remote device, such as server 602. For instance, in one embodiment, the game controller 606 can be configured to report error conditions that have been detected on the gaming device 604, such as if a device has malfunctioned or needs attention. For instance, the reporting software can be used to send a message from the gaming device 604 to the server 602 indicating that a printer on the gaming device needs a refill of tickets. In another embodiment, the gaming controller 606 can be configured to report security events that may have occurred on the gaming device 604, such as but not limited to if a door is opened, a latch is activated or an interior portion of the gaming device 604 has been accessed.

In yet other embodiments, the game controller 606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 604. As part of a loyalty program, the gaming activity can be associated with a particular player. The reporting software can include player tracking elements that allow the gaming activity of a particular player to be reported to a remote device, such as server 602.

The game controller 606 can execute the authentication software to verify the authenticity of data and/or software programs executed on the gaming device 604. For instance, the authentication software can be used to verify the authenticity of data and/or software applications when they are first downloaded to the gaming device 604. Further, the authentication software can be used to periodically verify the authenticity of data and/or software applications currently residing on the gaming device, such as software applications stored on one of the memories coupled to the gaming device 604 including applications loaded into the memory 628 for execution by the processor 626.

The communication software executed by the game controller 606 can be used to communicate with a variety of devices remote to the gaming device 604. For instance, the communication software can be used to communicate with one or more of a) servers remote to the device, such as 602, b) other gaming devices, such as table gaming device 652, mobile gaming device 654 and slot-type gaming device 656 and c) mobile devices carried by casino personnel or players in the vicinity of the gaming device 604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 604 can communicate with one or more remote devices via one or more network interfaces, such as 612. For instance, via network interfaces 612 and the network 601, the gaming device 604 can communicate with other gaming devices, such as server 602 and/or gaming devices, 652, 654 and 656. The network interfaces can provide wired or wireless communications pathways for the gaming device 604. Some gaming devices may not include a network interface or can be configured to operate in a stand-alone mode where the network interface is not connected to a network.

In other embodiments, a mobile device interface or interfaces, such as 614, can be provided for communicating with a mobile device, such as a cell phone, a laptop, netbook or a tablet computer carried by players or casino personnel temporarily in the vicinity of the gaming device 604. A wireless communication protocol, such as Bluetooth™ and a Wi-Fi compatible standard, can be used for communicating with the mobile devices via the mobile device interfaces 614. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 604. The wired communication interface can be configured to provide communications between the gaming device 604 and the mobile device and/or providing power to the mobile device.

Near field communication, or NFC, allows for simplified transactions, data exchange, and connections with a touch. Formed in 2004, the Near Field Communication Forum (NFC Forum) promotes sharing, pairing, and transactions between NFC devices and develops and certifies device compliance with NFC standards. NFC's short range helps keep encrypted identity documents private. Thus, a smartphone or tablet with an NFC chip can make a credit card/debit card payment to a gaming device or serve as keycard or ID card for a loyalty program. Further, an NFC device can act a hotel room key. The user of an NFC device as a hotel room keys and/or a player tracking card instrument may allow fast VIP check-in and reduce staffing requirements.

NFC devices can read NFC tags on a gaming device 604 to get more information about the gaming device including an audio or video presentation. For instance, a tap of an NFC enabled device to a gaming device can be used to instantly share a contact, photo, song, application, video, or website link. In another example, an NFC enabled device can be used to transfer funds to the gaming device or enter the player in a multi-player tournament. As another example, an NFC enabled device can be used to receive information from a gaming device that can be used in a persistent gaming application or a social media application.

Further, NFC enabled signage can include NFC tags that allow a patron to learn more information about the content advertised in the signage. The NFC enabled signage can be part of a gaming system. For instance, a sign advertising a show available at the casino can be configured to transfer information about the show, show times and ticketing information via an NFC tag. As another example, a sign showing jackpot information, such as progressive jackpot information, can be used to transfer information about the jackpot, such as the last time the jackpot was won and where it was won.

In one embodiment, an NFC interface on a gaming device can be used to set-up a higher speed communication between the gaming device and another NFC enabled device such as smart phone. The higher speed communication rates can be used for expanded content sharing. For instance, a NFC and Bluetooth enabled gaming device can be tapped by an NFC and Bluetooth enabled smart phone for instant Bluetooth pairing between the devices. Instant Bluetooth pairing between a gaming device and an NFC enabled device, such as a smartphone, can save searching, waiting, and entering codes. In another example, a gaming device can be configured as an NFC enabled router, such as a router supporting a Wi-Fi communication standard. Tapping an NFC enabled device to an NFC enabled and Wi-Fi enabled gaming device can be used to establish a Wi-Fi connection between the two devices.

Figure 6:
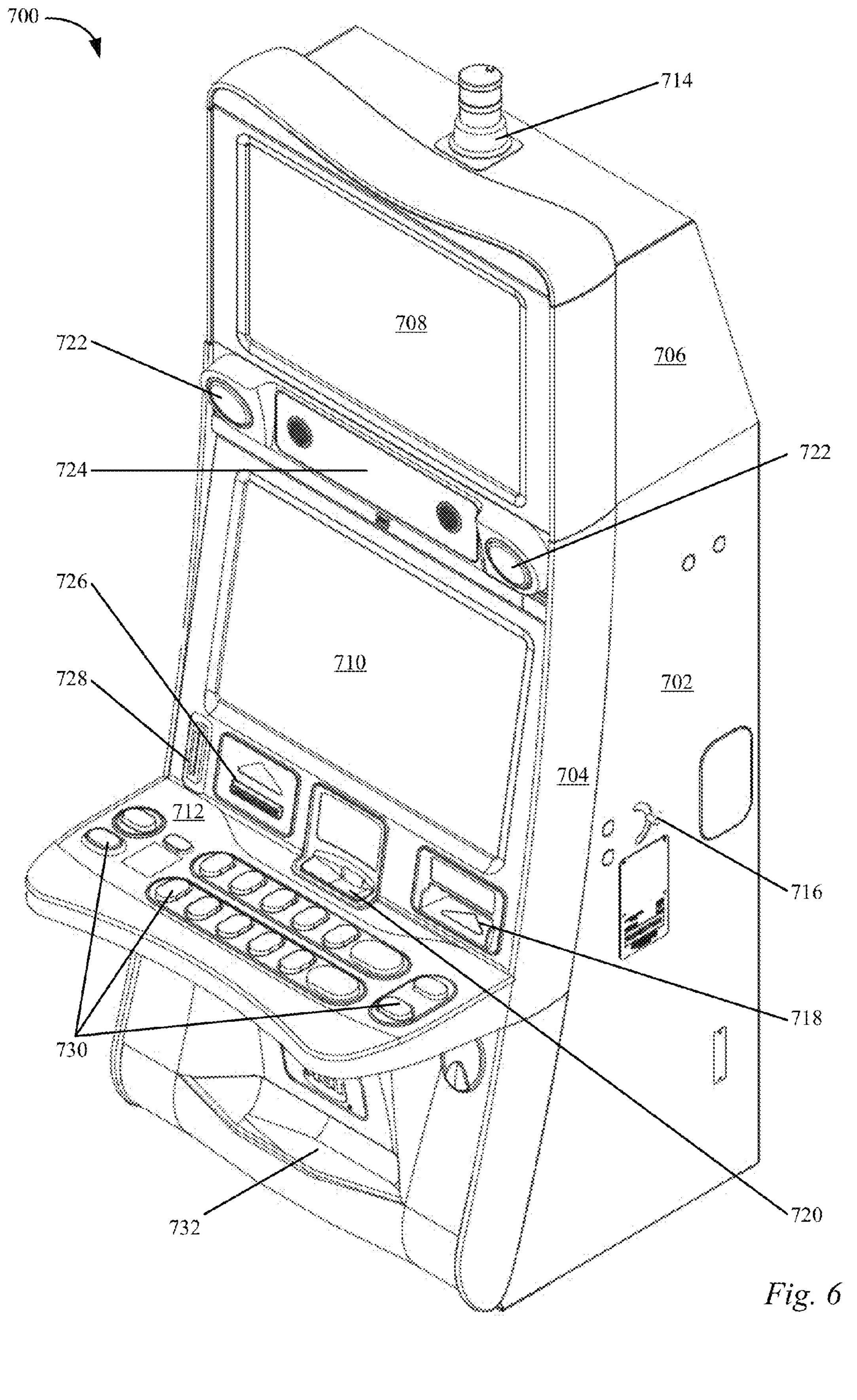
FIG. 6 shows a perspective drawing of a gaming device in accordance with the described embodiments.

The gaming device 604 can include one or more each of value input devices 616 and value output device 618. The value input devices 616 can be used to deposit cash or indicia of credit onto the gaming device. The cash or indicia of credit can be used to make wagers on games played on the gaming device 604. Examples of value input devices 616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 6.

The value output devices can be used to dispense cash or indicia of credit from the gaming device 604. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 6.

The combination of value input devices 616 and value output devices 618 can vary from device to device. In some embodiments, a gaming device 604 may not include a value input device or a value output device. For instance, a thin-client gaming device used in a mobile gaming application may not include a value input device and a value output device. Instead, a remote account can be used to maintain the credits won or lost from playing wager-based games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 604 can include one or more secondary controllers 619. The secondary controllers can be associated with various peripheral devices coupled to the gaming device, such as the value input devices and value output devices described in the preceding paragraphs. As another example, the secondary controllers can be associated with peripheral devices associated with the player interface 608, such as input devices, video displays, electro-mechanical displays and a player tracking unit. In some embodiments, the secondary controllers can receives instructions and/or data from and provide responses to the game controller 606. The secondary controller can be configured to interpret the instructions and/or data from the game controller 606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 606 characterizing the touch input.

In a particular embodiment, a secondary controller can be used to control a number of peripheral devices independently of the game controller 606. For instance, a player tracking unit can include one or more of a video display, a touch screen, card reader, network interface or input buttons. A player tracking controller can control these devices to provide player tracking services and bonusing on the gaming device 604. In alternate embodiments, the game controller 604 can control these devices to perform player tracking functions. An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 606, which does control the wager-based game. In general, using a secondary controller, certain functions of the gaming device 604 that are not subject to as much regulatory scrutiny as the game play functions can be decoupled from the game controller 606 and implemented on the secondary controller instead. An advantage of this approach, like for the player tracking controller, is that software approval process for the software executed by the secondary controller can be less intensive than the process needed to get software approved for the game controller.

A mass storage unit(s) 620, such as a device including a hard drive, optical disk drive, flash memory or some other memory storage technology can be used to store applications and data used and/or generated by the gaming device 604. For instance, a mass storage unit, such as 620, can be used to store gaming applications executed by the game controller 606 where the gaming device 604 can be configured to receive downloads of game applications from remote devices, such as server 602. In one embodiment, the game controller 606 can include its own dedicated mass storage unit. In another embodiment, critical data, such as game history data stored in the power-hit tolerant memory 630 can be moved from the power-hit tolerant memory 630 to the mass storage unit 620 at periodic intervals for archival purposes and to free up space in the power-hit tolerant memory 630.

The gaming device 604 can include security circuitry 622, such as security sensors and circuitry for monitoring the sensors. The security circuitry 622 can be configured to operate while the gaming device is receiving direct power and operational to provide game play as well as when the gaming device is uncoupled from direct power, such as during shipping or in the event of a power failure. The gaming device 604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 604, such as a mobile device has been moved to an unauthorized area. The security monitoring circuitry can be configured to generate, store and/or transmit error events when the security events, such as accessing the interior of the gaming device, have occurred. The error events may cause the game controller 606 to place itself in a "safe" mode where no game play is allowed until the error event is cleared.

The server 602 can be configured to provide one or more functions to gaming devices or other servers in a gaming system 600. The server 602 is shown performing a number of different functions. However, in various embodiments, the functions can be divided among multiple servers where each server can communicate with a different combination of gaming devices. For instance, player interface support 636 and gaming device software 638 can be provided on a first server, progressives can be provided on a second server, loyalty program functions 640 and accounting 648 can be provided on a third server, linked gaming 644 can be provided on a fourth server, cashless functions 646 can be provided on a fifth server and security functions 650 can be provided on a sixth server. In this example, each server can communicate with a different combination of gaming devices because each of the functions provided by the servers may not be provided to every gaming device in the gaming system 600. For instance, the server 602 can be configured to provide progressive gaming functions to gaming devices 604, 652 and 656 but not gaming device 654. Thus, the server 602 may not communicate with the mobile gaming device 654 if progressive functions are not enabled on the mobile gaming device at a particular time.

Typically, each server can include an administrator interface that allows the functions of a server, such as 602, to be configured and maintained. Each server 602 can include a processor and memory. In some embodiments, the servers, such as 602, can include a game controller with components, such as but not limited to a power-hit tolerant memory 630, a trusted memory 632 and an RNG 634 described with respect to gaming device 604. The servers can include one or more network interfaces on which wired or wireless communication protocols can be implemented. Next, some possible functions provided by the server 602 are described. These functions are described for the purposes of illustration only and are not meant to be limiting.

The player interface support 636 can be used to serve content to gaming devices, such as 604, 652, 654 and 656, remote to the server. The content can include video and audio content that can be output on one of the player interfaces, such as 608, 652*a*, 654*a* and 656*a*. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 636 can be affected by inputs made on the gaming device. For instance, the service window can be generated on a touch screen display where inputs received via the service window can be sent back to server 602. In response, to the received inputs, the server 602 can adjust the content that is displayed on the remote gaming device that generated the inputs.

The "service window" application can be generated by software code that is executed independently of other game controller software in a secure "sandbox." Via the sandbox, an executable can be given limited access to various resources on an EGM, such as a portion of the CPU resources and memory available on a game controller. The memory can be isolated from the memory used by other processes, such as game processes executed by the game controller.

As described above, a service window application can be allowed to control, send and/or receive data from secondary devices on the EGM, such as a video display, a touch screen power interfaces or communication interfaces. A service window application allowed to utilize a communication interface, such as a wireless communication interface, can be configured to communicate with a portable electronic device via the communication interface. In another embodiment, via the video display, the service window application can be configured to output data in an optical image format, such as a 1-D/2-D bar-code or a QR code. The optically formatted data can be captured by a camera on the portable electronic device. For instance, information about a promotion can be displayed in the service window in a QR code format and transferred to a user's portable electronic device via an image capture device on their portable electronic device.

If a player's identity is known, then the player interface support 636 can be used to provide custom content to a remote gaming device, such as 604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 640. The custom content can include notifications, advertising and specific offers that are determined to be likely of interest to a particular player.

The gaming device software function 638 can be used to provide downloads of software for the game controller and/or second controllers associated with peripheral devices on a gaming device. For instance, the gaming device software 638 may allow an operator and/or a player to select a new game for play on a gaming device. In response to the game selection, the gaming device software function 638 can be used to download game software that allows a game controller to generate the selected game. In another example, in response to determining that a new counterfeit bill is being accepted by bill acceptors in the gaming system 600, the gaming device software function 638 can be used to download a new detection algorithm to the bill acceptors that allow the counterfeit bill to be detected.

The progressive gaming function 642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 640 can be used to implement a loyalty program within a casino enterprise. The loyalty function 640 can be used to receive information regarding activities within a casino enterprise including gaming and non-gaming activities and associate the activities with particular individuals. The particular individuals can be known or may be anonymous. The loyalty function 640 can used to store a record of the activities associated with the particular individuals as well as preferences of the individuals if known. Based upon the information stored with the loyalty function 640 comps (e.g., free or discounted services including game play), promotions and custom contents can be served to the particular individuals.

The linked gaming function 644 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 650 can be used to combat fraud and crime in a casino enterprise. The security function 650 can be configured to receive notification of a security event that has occurred on a gaming device, such as an attempt at illegal access. Further, the security function 650 can receive transactional data that can be used to identify if gaming devices are being utilized in a fraudulent or unauthorized manner. The security function 650 can be configured to receive, store and analyze data from multiple sources including detection apparatus located on a gaming device and detection apparatus, such as cameras, distributed throughout a casino. In response to detecting a security event, the security function 650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 604 is described.

FIG. 6 shows a perspective drawing of a gaming device 700 in accordance with the described embodiments. The gaming device 700 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 700, deployed in a central determination configuration, may receive game outcomes from a remote server but still provide cash handling capabilities. Further, the peripheral devices can vary from gaming device to gaming device. For instance, the gaming device 700 can be configured with electro-mechanical reels to display a game outcome instead of a video display, such as 710. Thus, the features of gaming device 700 are described for the purposes of illustration only and are not meant to be limiting.

The gaming device 700 can include a main cabinet 702. The main cabinet 702 can provide a secure enclosure that prevents tampering with the device components, such as a game controller (not shown) located within the interior of the main cabinet and cash handing devices including a coin acceptor 720, a ticket printer 726 and a bill acceptor 718. The main cabinet can include an access mechanism, such as door 704, which allows an interior of the gaming device 700 to be accessed. The actuation of the door 704 can be controlled by a locking mechanism, such as lock 716. The lock 716, the door 704 and the interior of the main cabinet 702 can be monitored with security sensors for detecting whether the interior has been accessed. For instance, a light sensor can be provided to detect a change in light-level in response to the door 704 being opened.

The interior of the main cabinet 700 can include additional secure enclosure, which can also be fitted with locking mechanisms. For instance, the game controller, such as game controller 606, shown in FIG. 5, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 720, the separate enclosure can protect the electronics of the game controller from potentially damaging coin dust.

A top box 706 can be mounted to the top of the main cabinet 702. A number of peripheral devices can be coupled to the top box 706. In FIG. 6, a display device 708 and a candle device 714 are mounted to the top box 706. The display device 708 can be used to display information associated with game play on the gaming device 700. For instance, the display device 708 can be used to display a bonus game presentation associated with the play of a wager-based game (One or more bonus games are often features of many wager-based games). In another example, the display device 708 can be used to display information associated with a progressive game, such as one or more progressive jackpot amounts. In yet another example, the display device 708 can be used to display an attract feature that is intended to draw a potential player's attention to the gaming device 700 when it is not in use.

The candle device 714 can include a number of lighting elements. The lighting elements can be lit in different patterns to draw attention to the gaming device. For instance, one lighting pattern may indicate that service is needed at the gaming device 700 while another light pattern may indicate that a player has requested a drink. The candle device 714 is typically placed at the top of gaming device 700 to increase its visibility. Other peripheral devices, including custom bonus devices, such as reels or wheels, can be included in a top box 706 and the example in FIG. 6 is provided for illustrative purposes only. For instance, some of the devices coupled to the main cabinet 702, such as printer 726, can be located in a different top box configuration.

The gaming device 700 provides a player interface that allows the play of a game, such as wager-based game. In this embodiment, the player interface includes 1) a primary video display 710 for outputting video images associated with the game play, 2) audio devices, such as 722, for outputting audio content associated with game play and possibly casino operations, 3) an input panel 712 for at least providing game play related inputs and 4) a secondary video display 708 for outputting video content related to the game play (e.g., bonus material) and/or the casino enterprise (e.g., advertising). In particular embodiments, one or both of the video displays, 708 and 710, can be equipped with a touch screen sensor and associated touch screen controller, for detecting touch inputs, such as touch inputs associated with the play of a game or a service window output to the display device.

The input panel 712 can include a number of electro-mechanical input buttons, such as 730, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 700 includes a card reader 728, a printer 726, a coin acceptor 720, a bill and/or ticket acceptor 720 and a coin hopper (not shown) for dispensing coins to a coin tray 732. These devices can provide value input/output capabilities on the gaming device 700. For instance, the printer 726 can be used to print out tickets redeemable for cash or additional game play. The tickets generated by printer 726 as well as printers on other gaming devices can be inserted into bill and ticket acceptor 718 to possibly add credits to the gaming device 700. After the ticket is authenticated, credits associated with the ticket can be transferred to the gaming device 700.

The device 718 can also be used to accept cash bills. After the cash bill is authenticated, it can be converted to credits on the gaming device and used for wager-based game play. The coin acceptor 720 can be configured to accept coins that are legal tender or tokens, such as tokens issued by a casino enterprise. A coin hopper (not shown) can be used to dispense coins that are legal tender or tokens into the coin tray 732.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, optical media (e.g., CD-ROMs, DVDs), magnetic tape, solid state drives (e.g., flash drives) and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A method of an electronic gaming machine (EGM) comprising:

determining a user is present at the EGM, determining a user-controlled portable electronic device is present at the EGM, the user-controlled portable electronic device having an operator interface configured to receive inputs from the user and to present outputs to the user;

determining that a gaming session on the EGM has ended based upon one or more of determining that a credit amount on the EGM has reached zero, a cashout command has been received, a player tracking card has been withdrawn from a card reader or combinations thereof;

responsive to determining that the gaming session has ended, and only when the EGM determines the portable electronic device is present at the EGM, determining a notification message is to be output on the EGM and outputting the notification message through a display of the EGM, wherein the notification message includes a reminder to take the portable electronic device;

determining the portable electronic device is abandoned if the portable electronic device remains present at the EGM for a time period after determining that the gaming session has ended; and responsive to determining the portable electronic device is abandoned, placing the EGM in an abandoned device state.

2. The method of claim 1, wherein the determining the user is present based upon detecting a deposit of credits on the EGM via a value input device coupled to the EGM.

3. The method of claim 1, wherein the determining the user is present is based upon determining from image data that the user is proximate to the EGM.

4. The method of claim 1, wherein the determining the user is present is based upon receiving player tracking information at the EGM.

5. The method of claim 1, wherein the determining the portable electronic device is present at the EGM is based upon establishing a communication session with the portable electronic via a wired or wireless communication interface.

6. The method of claim 1, wherein the EGM includes a structure configured to receive the portable electronic device and wherein the determining the portable electronic device is present at the EGM is based upon detecting the portable electronic device is received in the structure.

7. The method of claim 1, wherein the EGM includes a sensor for the detecting the portable electronic device is received in the structure.

8. The method of claim 1, wherein the EGM includes a power interface for supplying power to the portable electronic device and wherein the determining the portable electronic device is present at the EGM is based upon determining that the portable electronic device is coupled to the power interface such that it can receive power.

9. The method of claim 1, wherein the determining the portable electronic device is present is based upon determining from image data that the portable electronic device is located proximate to the EGM.

10. The method of claim 1, wherein the determining the portable electronic device is abandoned is based upon, determining in image data that the portable electronic device is present and the user is no longer present.

11. The method of claim 1, wherein the determining the portable electronic device is abandoned is based upon determining the EGM is in an idle state and determining that the portable electronic device previously detected at the EGM is still present.

12. The method of claim 1, wherein the determining the portable electronic device is abandoned is based upon a) determining the user is no longer present and b) determining a proximate location of the portable electronic device has not changed over a time period.

13. The method of claim 1, wherein the determining the portable electronic device is abandoned is based upon at a particular time a) determining that the portable electronic device is previously detected at the EGM is still present, b) determining that the user is no longer present, c) determining that a second user and/or a second portable electronic device is present at the EGM.

14. The method of claim 1, wherein the response to determining the portable electronic device is abandoned includes sending a notification message to a remote server that the portable electronic device is abandoned.

15. The method of claim 14, wherein the message includes one or more of identifying information associated with the EGM, information associated the portable electronic device, information associated with the user, information associated with one or more game play states on the EGM prior to determining the portable electronic device has been abandoned or combinations thereof.

16. The method of claim 14, wherein the message includes information indicating a proximate location of the portable electronic device relative to a location of the EGM.

17. The method of claim 1, wherein the response to determining the portable electronic device is abandoned includes changing a state of a candle on the EGM.

18. The method of claim 1, wherein the response to determining the portable electronic device is abandoned includes suspending an availability of game play on the EGM.

19. The method of claim 1, further comprising: clearing the abandoned device state on the EGM.

20. The method of claim 19, wherein the clearing of the abandoned device state on the EGM requires input from an operator.

21. A method of an electronic gaming machine (EGM) comprising:

determining a user-controlled portable electronic device, separate from the EGM, is located on or near the EGM, the user controlled-portable electronic device having an operator interface configured to receive inputs from the user and to present outputs to the user;

when the EGM determines the object is located on or near the EGM, and after determining that a gaming session on the EGM has ended, outputting a message on the display of the EGM, wherein the message includes a reminder to take the portable electronic device;

after outputting the message, determining the object is abandoned; and in response to determining the portable electronic device is abandoned, placing the EGM in an abandoned device state wherein the abandoned device state includes sending a message to a remote gaming device.

22. An electronic gaming machine comprising: A method of an electronic gaming machine (EGM) comprising:

a cabinet;

a game controller disposed within the cabinet including a processor, a memory and a network interface, the game controller configured to:

control a wager-based game played on the EGM, determine a user is present at the EGM, determine a user-controlled portable electronic device is present at the EGM, the user controlled-portable electronic device having an operator interface configured to receive inputs from the user and to present outputs to the user;

determine that a gaming session on the EGM has ended, responsive to determining that the gaming session has ended, and only when the EGM determine the portable electronic device is present at the EGM, determine a notification message is to be output on the EGM and output the notification message through a display of the EGM, wherein the notification message includes a reminder to take the portable electronic device, determine the portable electronic device is abandoned if the portable electronic device remains present at the EGM for a time period after determining that the gaming session has ended, and in response, place the EGM in an abandoned device state.

23. An electronic gaming machine comprising:

a cabinet;

a secondary gaming device coupled to the cabinet including:

a secondary processor, including a processor and a memory, separate from a game controller wherein the secondary processor is configured to:

determine a user is present at the EGM, determine a user-controlled portable electronic device is present at the EGM, the user controlled-portable electronic device having an operator interface configured to receive inputs from the user and to present outputs to the user;

determine that a gaming session on the EGM has ended;

responsive to determining that the gaming session has ended, and only when the EGM determine the portable electronic device is present at the EGM, determine that a notification message is to be output on the EGM and output the notification message through a display of the EGM, wherein the notification message includes a reminder to take the portable electronic device;

determine the portable electronic device is abandoned if the portable electronic device remains present at the EGM for a time period after determining that the gaming session has ended, and in response, generate an abandoned device state on the secondary gaming device;

the game controller disposed within the cabinet including a processor, a memory and a network interface, the game controller configured to control a wager-based game played on the EGM.

24. The electronic gaming machine of claim 23, wherein the secondary gaming device is one of a player tracking unit, a card reader, a bill validator or a printer.

* * * * *